United States Patent [19]

Rault et al.

[11] Patent Number: 6,058,118
[45] Date of Patent: May 2, 2000

[54] METHOD FOR THE DYNAMIC RECONFIGURATION OF A TIME-INTERLEAVED SIGNAL, WITH CORRESPONDING RECEIVER AND SIGNAL

[75] Inventors: Jean Christophe Rault, Rennes; Jean-Pierre Bauduin, Combourg; Jean-Michel Lemesle, Rennes, all of France

[73] Assignee: France Telecom & Telediffusion de France, Paris, France

[21] Appl. No.: 08/875,100

[22] PCT Filed: Nov. 22, 1995

[86] PCT No.: PCT/FR95/01538

§ 371 Date: Sep. 29, 1997

§ 102(e) Date: Sep. 29, 1997

[87] PCT Pub. No.: WO96/21293

PCT Pub. Date: Jul. 11, 1996

[30] Foreign Application Priority Data

Dec. 30, 1994 [FR] France .................................. 94 16034

[51] Int. Cl.$^7$ ...................................................... H04J 15/00
[52] U.S. Cl. .......................... 370/464; 370/431; 375/259; 375/295
[58] Field of Search .................................... 375/259, 295; 345/418; 370/312, 431, 464; 714/752; 704/553; 380/28

[56] References Cited

U.S. PATENT DOCUMENTS 3,982,077  9/1976  Clark et al. ............................ 370/535
5,283,780  2/1994  Schuchman et al. ................... 370/312
5,606,707  2/1997  Tomassi et al. ........................ 345/418
5,659,580  8/1997  Partyka ................................. 375/295
5,912,917  6/1999  Engelbrecht et al. .................. 375/259

FOREIGN PATENT DOCUMENTS

WO 82 02465  6/1982  European Pat. Off. .
0 208 604    1/1987  France .

OTHER PUBLICATIONS

J.L. Riley (BBC) The DAB Multiplex and System Support Features, EBU Technical Review, Spring 1994, Switzerland, No. 259, ISSN 0251–0936 pp. 11–23.

Primary Examiner—Hassan Kizou
Assistant Examiner—John Pezzlo
Attorney, Agent, or Firm—Kinney & Lange, P.A.

[57] ABSTRACT

A method for the dynamic reconfiguration of a signal frame structure, wherein each frame is structured in at least one subchannel having a number, order and/or format capable of being altered under the control of a reallocation command, time interleaving on N frames being selectively performed for each subchannel. According to the method, in the transient state, and for the N frames following a reallocation command, the procedure for writing data elements according to the interleaving law remains unchanged, in accordance with the new structure defined by a reallocation command, and a specific logic for rereading the memory plane is implemented so that the frames consist of uniform capacity units comprising data elements from the same source signal. The corresponding transmitters, receivers and signals are also disclosed.

9 Claims, 6 Drawing Sheets

Fig. 4

METHOD FOR THE DYNAMIC RECONFIGURATION OF A TIME-INTERLEAVED SIGNAL, WITH CORRESPONDING RECEIVER AND SIGNAL

BACKGROUND OF THE INVENTION

The field of the invention is that of the transmission of digital signals (or sampled and digitized analog signals) to one or more receivers. More specifically, the invention can be applied to transmission systems enabling the transmission of a multiplex that is generally (but not exclusively) formed by several independent source signals, according to a multiplex structure that can be redefined according to need, and implementing a time interleaving of the data elements that form these source signals.

A particular field of the invention is that of the transmission of signals that simultaneously implement a plurality of carrier frequencies, each encoded by distinct digital data elements.

Signals of this kind are generally designated by the term FDM (frequency division multiplex) signals. A particular example of these signals to which the invention can be applied is that of OFDM (orthogonal frequency division multiplex) signals.

An OFDM signal is used for example in the digital broadcasting system described for example in the French patent application FR-86 09622 filed on Jul. 2nd 1986 and in the document by M. Alard and R. Lassalle, "Principes de modulation et de codage canal en radiodiffusion numérique vers les mobiles" (Principles of channel modulation and encoding in digital broadcasting to moving bodies), Revue de l'U.E.R., No. 244, August 1987, pp. 168–190, known as the COFDM (coded orthogonal frequency division multiplex) system.

This COFDM system has been developed in particular within the framework of the European DAB (digital audio broadcasting) project. It is also a candidate for standardization for the terrestrial broadcasting of digital television.

The signals transmitted by such systems take the form of successive frames, each frame comprising all the carrier frequencies. Several source signals can therefore be conveyed simultaneously, each source signal being for example, at a given instant, associated with a set of frequencies. The term "source signal" is understood of course to mean both signals that are quite independent, corresponding to various applications (sound, images, telematics, data, etc.) and distinct signals (or fluxes) of one and the same application (for example the right-hand and left-hand channel for a stereophonic signal, subtitling, translation, images associated with a main signal, etc.).

It can easily be understood that it is desirable that the structuring of the frame into data channels (corresponding to each source signal) should be modifiable as a function of need. For example, it may be the case that a station may make transmission only occasionally, and may therefore not have need for transmission resources except at its transmission times. It may also happen that the needs relating to an application may vary in the course of time: for example with the stereophonic transmission of music and the monophonic transmission of speech, the addition of a translation sound signal, the transmission of an illustration, etc. Yet another example is that of radio-message networks, where needs constantly vary. More generally, the administrator of the network may, for one reason or another, wish to change the structure of the frames.

One technique used to manage the structuring in frames and its reconfiguration is described in the patent FR-90 16383 dated Dec. 19th 1990 filed on behalf of the same Applicants and entitled "System for the transmission of data by distribution in the time-frequency space with channel structuring". According to this technique, at least certain frames periodically include a description of the current structure. Thus, any receiver may have knowledge of this structure so as to extract the signal or signals pertaining to it therefrom.

This technique has been introduced into the DAB standard. In this standard, the frame is divided into sub-channels. This terminology shall be preserved hereinafter without however thereby restricting the scope of the invention. It must be noted that, on the contrary, the invention can be applied to any type of structuring. In particular, it is possible to provide for several levels of structuring (into channels and sub-channels, etc.), several types of sub-channels (transparent sub-channels or packet sub-channels for example), etc.

A change in structuring, or a multiplex reconfiguration, may be requested at any time (the DAB standard provides for a minimum period of 16 frames, for reasons explained hereinafter). One problem however arises during each reconfiguration, owing to the time interleaving.

Indeed it is not possible to change a structure instantaneously. There exists a transient state of N frames, N being the depth of the time interleaving. More specifically, if we consider the N frames of the transient phase according to a reconfiguration decision, it is observed that they have to be built partially according to the previous structuring (with digital elements interleaved prior to the reconfiguration command) and partially according to the new structuring (digital elements interleaved after the command).

Thus, in the case of the DAB, it is known that the time interleaving method leads to the introduction of a total delay of 15 frames (at 24 ms, giving 360 ms). This delay is distributed between transmission (interleaving) and reception (de-interleaving).

In fact, a given bit is delayed by p frames at transmission during the interleaving and by (15-p) frames at reception during the de-interleaving. The number p is determined by the rank of the bit, modulo 16, in the sub-channel.

To introduce these delays, it is necessary, for each sub-channel, to memorize the bits of this sub-channel corresponding to the 16 most recent frames. The interleaving memory therefore contains all the bits of all the sub-channels on a horizon of 16 frames.

The memory allocation chosen is identical to that of the frame (called a CIF frame) but with a depth of 16 frames. Since each sub-channel has a number of 64-bit capacity units (or CU) that is an integer, the memory must be shared with an elementary size of 64 bits.

FIG. 1 can be used to take account of this memory allocation for an example with three sub-channels, 11, 12, 13. The structure of the frame 14 comprises 864 CU. A memory compartment 16 of the memory array 17 can therefore be characterized by two numbers that shall be called i and j (column, row), i corresponding to the rank of the bit in the frame and varying from 0 to 55295, and j corresponding to the index of the CIF frame and varying from 0 to 15.

The bits of a sub-channel are written in this memory so as to provide for the time interleaving.

For example, in the case of the DAB standard, to generate the CIF frame with an index n, the bit with the rank i in the sub-channel shall be written in the box characterized by i and j=f(i), hence in the column with a rank i but on a row with a rank "j" depending on i or rather on the rest of the division of i by 16 (a CIF frame being characterized by 55296 bits written on the same row).

Table 1 gives the value of the row j as a function of the remainder of the division of i by 16 and of the index n of the frame.

TABLE 1

| Remainder of the division of i by 16 (rank i of the bit in the frame) | Row in which the rank i bit is written (frame to which the rank i bit belongs) |
|---|---|
| 0 | r |
| 1 | r-8 |
| 2 | r-4 |
| 3 | r-12 |
| 4 | r-2 |
| 5 | r-10 |
| 6 | r-6 |
| 7 | r-14 |
| 8 | r-1 |
| 9 | r-9 |
| 10 | r-5 |
| 11 | r-13 |
| 12 | r-3 |
| 13 | r-11 |
| 14 | r-7 |
| 15 | r-15 |

The re-reading of the sub-channel is done simply row-wise (first row for the frame with an index r).

With regard to the time interleaving function, the dynamic reconfiguration of the multiplex signifies a change in allocation of the sub-channels in the CIF frame.

This may be a change in the position of one or more sub-channels in the CIF frame, without any change in the bit rate. It may also be a reduction in the bit rate, hence of the number of CUs for a sub-channel or on the contrary an increase in the bit rate. The last two events also prompt a modification of the allocation of CUs in the CIF frame.

This change is requested by the multiplexing equipment and may be interpreted by a microprocessor which knows, frame after frame, the allocation of the CUs in the CIF frame.

The DAB standard lays down that, in the CIF frame, the change should be instantaneous and that the CU should always consist of bits belonging to the same sub-channel.

If read/write operations are done as described here above, it means that, as soon as there is a change in allocation, the bits of the sub-channel will be written and read at the memory location corresponding to the new allocation.

After more than 16 frames, when this memory has been completely filled by the appropriate sub-channel, the re-reading of this memory part will contain only bits of this same sub-channel and, consequently, the interleaving function will be completely operational (the system will be in a "steady" or "normal" state).

However, during the 15 frames following the change in allocation, the location corresponding to the new allocation does, of course, contain bits of the sub-channel newly allocated to this part but also bits belonging to the sub-channel formerly allocated to this part of the memory. This leads to the formation of CUs containing bits of two different sub-channels. The signal thus transmitted is not compatible with the standard during this 15×24 ms=360 ms transmission which, to put it briefly, is due to the inertia of the storage of the 15 previous frames.

The N frames of the transient phase are therefore non-homogeneous and therefore not decodable. In a decoder, they correspond to a noise or passing parasitic phenomenon.

To limit this problem, it is possible, as soon as the reconfiguration instruction is received, to consider the building of frames in a new structure, namely with units of homogeneous capacity (belonging to one and the same channel). This technique however does not resolve the problem since these capacity units would be incomplete during the transient phase. Furthermore, this technique leads to a loss of the last elements of data interleaved according to the preceding structure.

Finally, this technique dictates a complex memory management system. For it would be necessary to write the data elements in an unoccupied memory zone. The drawback of this method is that, firstly, it requires a quantity of memory greater than 16×55296 bits, and secondly that it makes it necessary to manage this memory like a hard disk of a computer permanently having an image of the memory occupied and the memory available. This memory management may become very complicated since, for example, if a sub-channel should need to increase its bit rate, then the number of additional CUs would be assigned to a non-contiguous memory zone. After several reconfigurations, including various increases and reductions of bit rates, the interleaving memory risks being subdivided into a very large number of blocks that are alternately free and occupied.

By way of an example, FIG. 2 shows how a reduction of a sub-channel and an increase of another may lead to the need to have additional memory space, create free zones and partition the memory allocated to a given sub-channel. The previous structure 21 provides for three sub-channels $22_1$ to $22_3$ leading to the occupation corresponding to the memory array 23. During the configuration, the new structure 24 provides for a broadening of the sub-channel $22_1$, the consequent shifting of the sub-channel $22_2$ and the reduction of the sub-channel $22_3$.

Consequently, the data elements of the sub-channel $22_1$ are written at the former stipulated location 26 but also in a new available zone 25, the zone 27 being taken up by the sub-channel $22_2$. When the normal state is again reached, the memory array has a vacant zone 28 since the sub-channel $22_3$ is reduced.

It can therefore be seen that the management of the memory can soon become very complicated, for the allocation of the sub-channels in the interleaving memory is completely independent of the allocation of the sub-channels in the CIF. Furthermore, a sub-channel may be allocated to several memory blocks like a file in the hard disk of a computer.

At the end of a certain number of reconfiguration operations, it might even be necessary to reset the process in order to recompact the interleaving memory so as to prevent the management of an excessively large number of pointers, and this resetting would imply a temporary interruption of the programs.

It is an aim of the invention in particular to overcome these different drawbacks of the prior art.

More specifically, an aim of the invention is to provide a method for the dynamic reconfiguration of the structure of the frames of a transmission system, through which there appears neither any data loss and nor any disturbance of the transmission despite the implementation of a time interleaving operation.

In other words, the invention is aimed at providing a method of this kind capable of the management, without loss of information, of the transient phase due to the interleaving when a reconfiguration is requested.

Another aim of the invention is to provide a method of this kind that requires no increase in storage capacity whether at transmission or at reception. More specifically, an aim of the invention is to enable the implementation of the method with a memory capacity corresponding to the size of a frame to be transmitted multiplied by the depth of the interleaving.

Yet another aim of the invention is to limit the increase in complexity due to the implementation of the method. In particular, it is an aim of the invention to provide a method of this kind that can be laid out for example in the form of a simple logic system consuming few transistors, in standard semiconductor components providing for the reception of a digital signal.

Another aim of the invention is to provide a method of this kind, capable of accepting any type of modification of the structuring (the size, number and location of the sub-channels) without any limits whatsoever, regardless of the rate of reconfiguration.

It is also an object of the invention to provide a method of this kind that does not disturb the working of the receivers that do not contain it (apart from the transient phase of course).

Another aim of the invention is to provide receivers capable of receiving and decoding the signals produced by the method of the invention that are simple to implement and are low-cost in terms of design and production.

SUMMARY OF THE INVENTION

These aims and others that shall appear hereinafter are achieved by means of a method for the dynamic reconfiguration of the structure of the frames of a signal in a transmission system providing for the transmission of said signal in the form of successive frames, each comprising one and the same number of capacity units each constituted by one and the same number of data elements, each of said frames being furthermore structured in at least one sub-channel, each of said sub-channels corresponding to a distinct source signal and being formed by a number of capacity units that is an integer, the number, order and/or format of said sub-channels being liable to be modified under the control of a reallocation instruction defining a new frame structure, a time interleaving on N frames being selectively implemented for each of said sub-channels, by means of a memory array formed by N rows each corresponding to the contents of a frame, and wherein, in a normal state, the data elements are recorded as a function of an interleaving relationship and re-read row by row, method according to which, in a transient state, for the N frames following a reallocation instruction:

the procedure for the recording of said data elements as a function of said interleaving relationship is unchanged, in keeping with the new structure defined by said reallocation instruction; and a specific logic for the re-reading of said memory array is implemented so that said N frames are constituted by homogenous capacity units formed by data elements coming from the same source signal.

Thus, according to the invention, the frames of the transient state are not read, row by row, linearly and according to a strictly rising order of addressing indices in the interleaving memory. On the contrary, the invention proposes an approach that is quite novel, has never been envisaged by those skilled in the art and consists in implementing a specific and adapted re-reading logic system.

In other words, during the transient state, each frame has a different structure that corresponds neither to the previous structure nor to the current structure, and the frames no longer follow precisely the pre-defined interleaving order but are all formed by homogenous capacity units. Gradually, the structure of the frames can "slide" from the previous structure to the current structure.

In this way, as soon as a receiver knows the construction logic of the frames, it is capable of reconstructing the source signals without loss.

It is seen that the memory capacitor is preserved, that no complexity whatsoever is added for the recording of the elements and that the only addition with respect to the prior art is the implementation of a re-reading logic that may be very simple.

This technique makes it possible to accept any kind of reconfiguration at any time even if a new reconfiguration is required whereas the operation is in a transient state.

Preferably, and at least for the capacity units assigned to a new sub-channel in said new frame structure, said specific re-reading logic consists in:

reading the data elements recorded in said memory array before said reallocation instruction as a function of the organization defined by the previous structure; and reading the data elements recorded in said memory array after said reallocation instruction as a function of the organization defined by the new structure.

In this case, advantageously, said re-reading logic generates a control signal enabling the selection of a read address for each data element, from a first address corresponding to the preceding structure and a second address corresponding to the new structure.

Preferably, said capacity units are constituted by a whole number, greater than or equal to 1, of data zones, each data zone comprising N data elements, and in that said time interleaving is done independently on blocks formed by N zones of data elements of N consecutive frames.

In this case, the time interleaving may consist, for each block formed by N rows and N columns, of the computation of a recording address in said block on the basis of the previous address in:

adding 1 modulo N to the column address to determine the new column address; and adding the column address written according to the reverse bit technique to the row address modulo N to determine the new row address.

This corresponds in particular to the technique implemented for the DAB standard.

Said control signal is then advantageously a binary signal representing, for each data zone, the result of the comparison between:

the number of frames transmitted from the implementation of the new frame structure; and the depiction, according to the reverse bit technique, of the rank modulo N of the current data element in said data zone.

According to a preferred embodiment, adapted to DAB, N is equal to 16, the data elements are binary, and in said transient state, five counters are managed:

a modulo 16 frame counter (cpt_frame);

a counter of the number of frames that have elapsed since a reconfiguration instruction (cpt_frame_ch) equal to 0 in a normal state and counting modulo 16;

a counter of capacity units allocated according to the new structure, on 10 bits (cpt_NCU);

a counter of capacity nits allocated according to the preceding structure, on 10 bits (cpt_ACU);

a counter of the rank of the binary data element in the capacity unit, on 6 bits (cpt_rank); a binary signal is determined for comparison between the value of said counter of the number of frames that have elapsed since a configuration instruction (cpt_frame_ch) and the four most significant bits of said rank counter (cpt_rank) read according to the "reverse bit" technique, and for each of said sub-channels of each of the frames of said transient state, the following steps are performed:

the computation of the addresses of the blocks in said memory array according to the previous structure and according to the current structure;

the resetting of the counters cpt_NCU, cpt_ACU, cpt_rank;

for each sub-channel:

the recording, in the memory, of the binary data elements to be recorded at the addresses on 20 bits of which:

the 6 least significant bits correspond to the rank counter (cpt_rank);

the 10 bits of medium significance correspond to the counter of capacity units allocated according to the new structure (cpt_NCU);

the 4 most significant bits correspond to the summation of said frame counter (cpt_frame) and the 4 least significant bits of said rank counter (cpt_rank) read according to the "reverse bit" technique, said rank counter (cpt_rank) being incremented at each data element;

the reading, in the memory, of the binary data elements to be read at the addresses on 20 bits of which:

the 6 least significant bits correspond to said rank counter (cpt_rank);

the 10 bits of medium significance correspond to the counter of capacity units allocated according to the new structure (cpt_NCU) if said binary comparison signal is equal to 1 and, if not, to said counter of allocated capacity units according to the preceding structure (cpt_ACU);

the 4 most significant bits correspond to said frame counter (cpt_frame), said rank counter (cpt_rank) being incremented at each data element;

the incrementation of said counter of capacity units allocated according to the new structure (cpt_NCU) and counter of capacity units allocated according to the previous structure (cpt_ACU).

The invention also relates to transmitters capable of transmitting this signal, as well as receivers capable of receiving it, in implementing a symmetrical reconstruction procedure. It also relates to the signal as such, for which the N frames following a reallocation instruction, corresponding to the frames of a transient state, are each formed by homogeneous capacity units, consisting of data elements coming from the same source signal, obtained by the implementation of a specific re-reading of a memory array in which the data elements to be transmitted are recorded.

DESCRIPTION OF THE DRAWINGS

Other features and advantages of the invention shall appear from the following description of a preferred embodiment of the invention, given by way of a non-restrictive example, and from the appended drawings of which:

FIG. 4 shows the interleaving technique implemented for each block of 16 data elements in the case of the DAB;

DETAILED DESCRIPTION OF THE PREFERRED EMBODIMENTS

The preferred embodiment described hereinafter corresponds to the DAB technique as currently standardized. In normal operation, the transmission and reception correspond exactly to the standard. By contrast, the transient state is modified.

Figure 1:
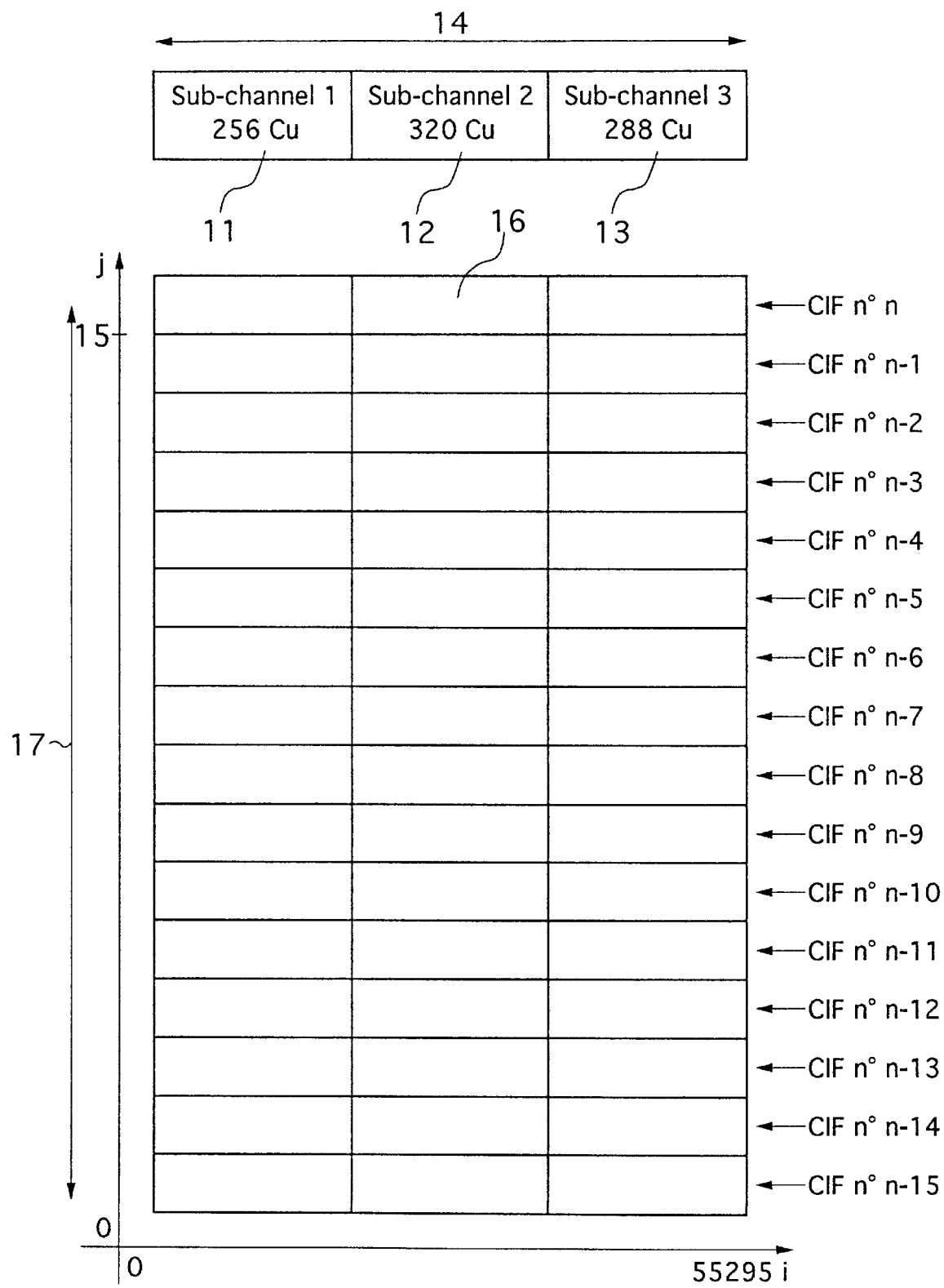
FIG. 1, already commented on in the introduction, shows a memory array adapted to a 16-frame interleaving in the case of a DAB signal with three sub-channels.
Figure 2:
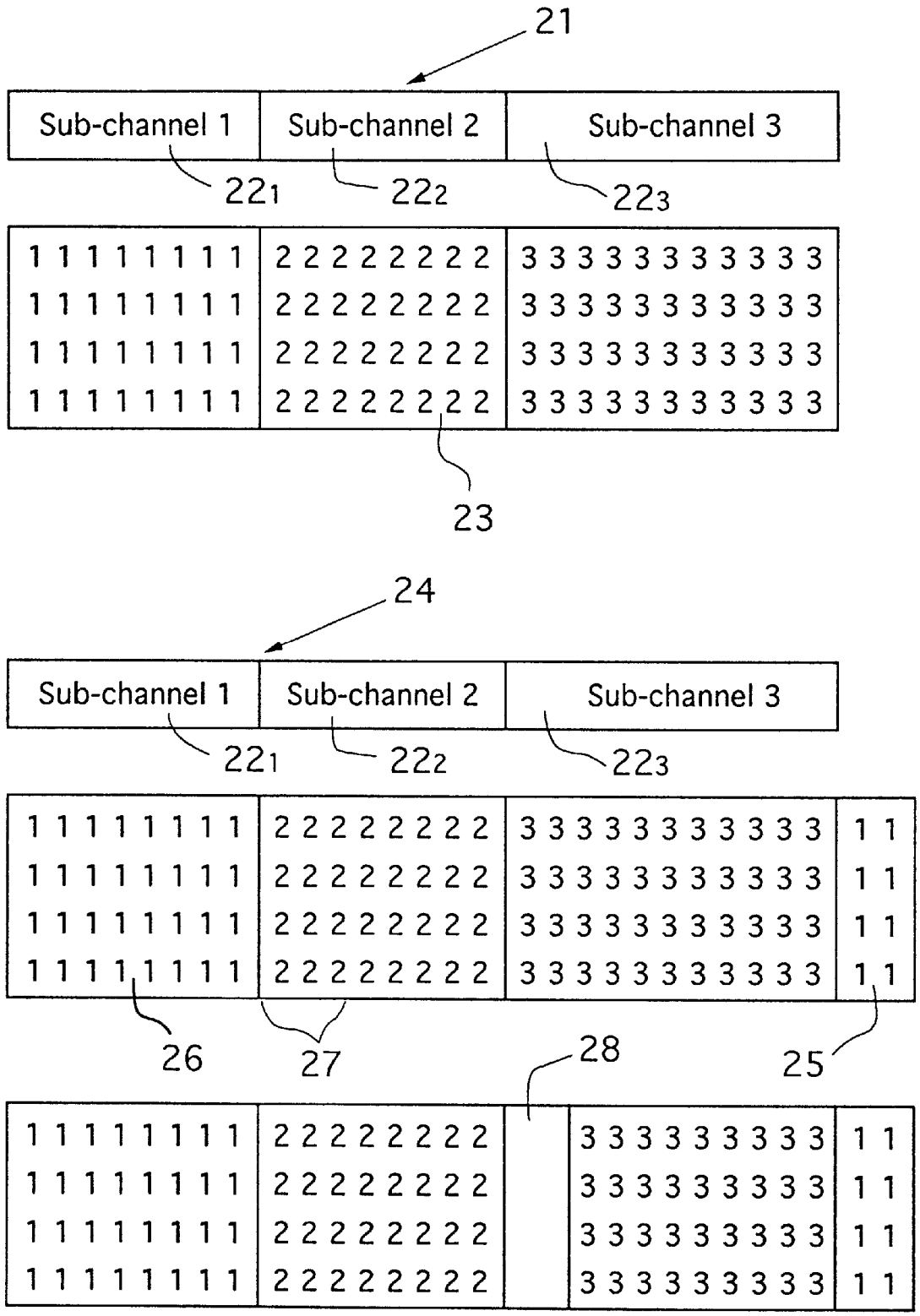
FIG. 2, also commented on in the introduction, illustrates the problem of the partitioning of the memory, in the case where a technique seeking to instantaneously apply the new configuration is implemented.
Figure 3:
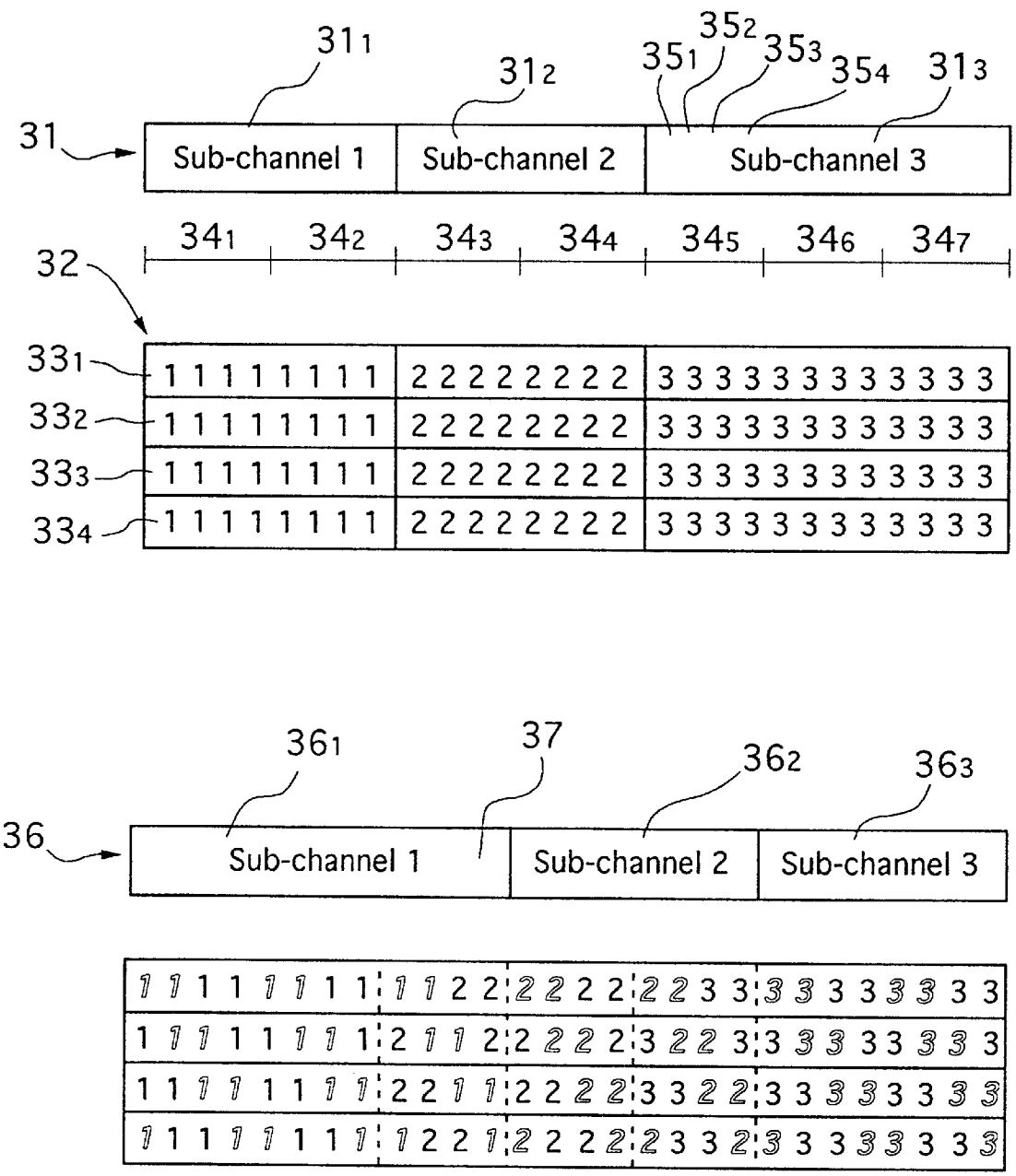
FIG. 3 provides a general illustration of the recording of the data elements according to the invention, in the memory array of FIG. 2.

FIG. 3 illustrates the recording of the data elements. At an initial stage, the structuring 31, consisting of three sub-channels $31_1$ to $31_3$, is followed. In this example, the memory array 32 consists of rows $33_1$ to $33_4$ each corresponding (in a normal state) to a frame to be sent. Each frame has seven capacity units $34_i$, each comprising four data elements $35_1$ to $35_4$.

Conventionally, each memory zone corresponding to each sub-channel is assigned data elements belonging to this sub-channel. Thus, the sub-channel $31_1$ receives the data elements referenced "1" distributed over two capacity units. Similarly, respectively, the sub-channels $31_2$ and $31_3$ receive the data elements "2" and "3".

In a normal state, it is clear that the capacity units are homogenous.

At a given instant, a new configuration 36 or structuring of the frame is defined, wherein:

the sub-channel $36_1$ is increased by one capacity unit 37;

the second sub-channel $36_2$ has an unchanged size but is shifted by one capacity unit;

the third sub-channel $36_3$ is reduced by one capacity unit.

At this instant of a new reconfiguration, the memory array is already partially filled in accordance with the previous structuring. This corresponds, in the figure, to the numerals represented by upright characters.

As soon as the configuration changes, the recording is done according to the new structuring 36 (numerals in italics).

After 4 frames (with 4 corresponding herein to the depth of the interleaving), a normal state is obtained again, with homogenous capacity units.

It will be understood that the data elements recorded in the capacity units that have changed their allocation cannot be homogeneous during the transient phase (see for example the capacity unit 37). It must be noted that the frames thus formed are contrary to the DAB standard.

Thus, the frames of the transient state correspond neither to the previous structure nor to the current structure. For each frame, it is a transient structure that the receivers (or at least some of them) are capable of determining symmetrically.

A more specific example corresponding to the DAB is now given.

Each sub-channel comprises a whole number of 64-bit blocks, hence in principle a whole number of 16-bit blocks.

The interleaving relationship is defined modulo 16, hence by blocks of 16 bits only. In the interleaving memory, it is possible to reason on the basis of a 16-bit block with a depth of 16 frames. The read/write addressing principle will be identical for all the memory blocks, whatever the channel considered.

Figure 4:
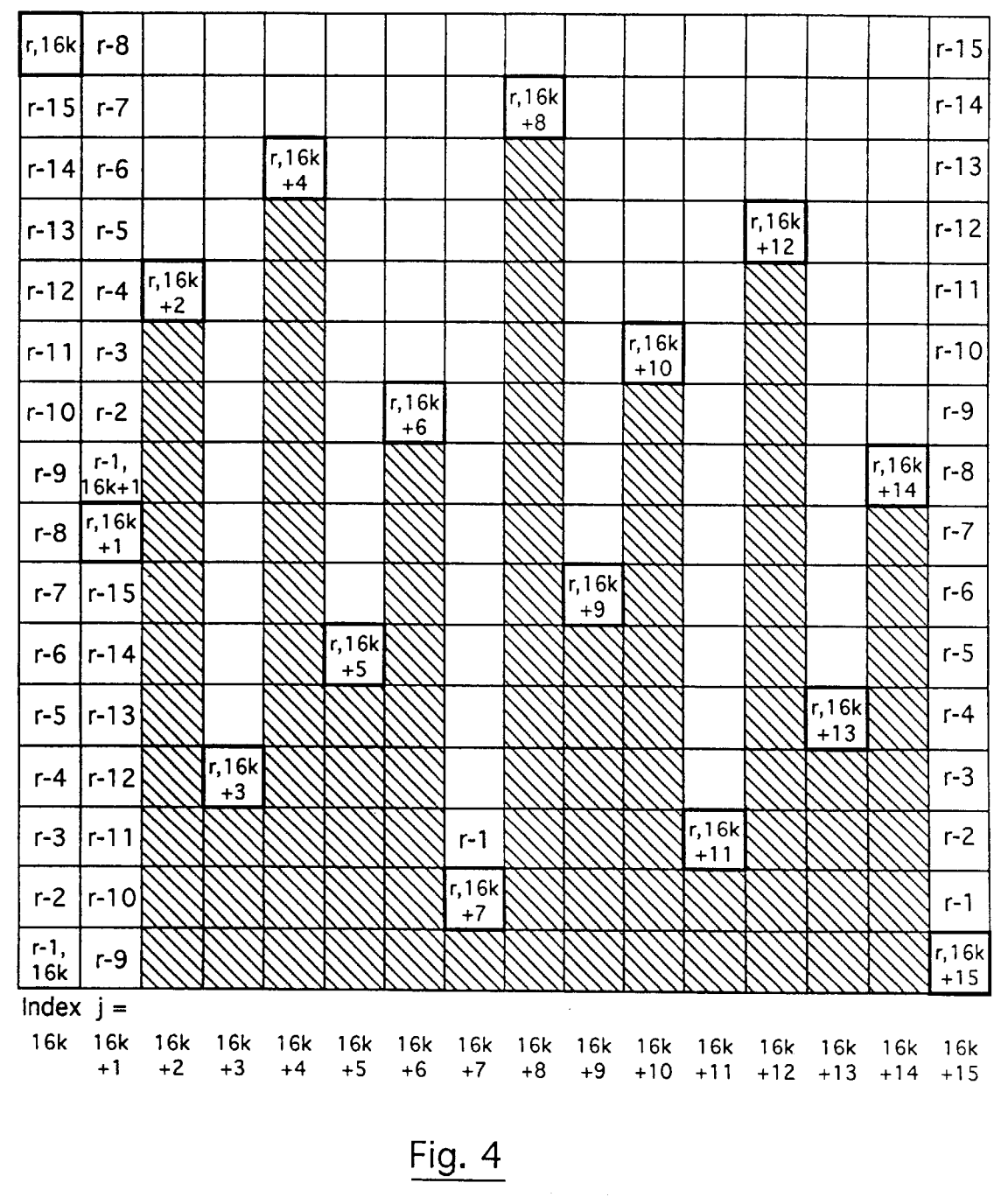

FIG. 4 shows a 16×16 bit block. In order to assign the appropriate delays (see Table 1) to each of the bits, these 16 bits are written column after column but at a row whose value depends on the current row and the value of the column (current row + "reverse bit" of the value of the column).

For example, for the 7th bit, if the current row is 0 (frame "r"), the following are written at the column 7 and at the row 0:
0+ "reverse bit" of 7
=0+0111 (read in reverse)
=0+1110
=14.

In FIG. 4, the boxes with bold black outline designate the writing of the 16 bits of the frame with a rank r.

The bits of the frame with a rank r+1 are written the same way but in the immediately lower box and so and so forth for r+2, r+3, . . .

The reading of the frame with a rank r is done column after column on the same row (herein the row 0).

The reading of the frame with the rank r+1 will be done on the row 1 and so on and so forth.

The writing is done always in the unoccupied boxes (hatched in the figure).

In steady operation, the 16×16 bits of the block belong to the same channel. We have just seen that the bits of a new frame are written in boxes defined by the rank of the frame and the position of the bit (0 to 15).

At the time of a change of allocation of the sub-channels in the CIF frame, the bits of a new sub-channel are written in the same block of 16×16 bits. However, the position of the writing operations does not depend on the sub-channel. These writing operations will be done as if the sub-channel had not changed, hence in the unoccupied boxes. During 15 frames, the block will contain bits of the two sub-channels but it can be seen that there is no "overwriting" of the useful bits.

An essential aspect of the invention is the specific re-reading logic. During the 15 frames (depending on the change the re-reading must be done) in the blocks corresponding to the CU newly allocated for the bits that have been written since the change and in the blocks corresponding to the CU formerly allocated for bits that were written before the change. The 6 least significant bits indicating the position of the bit in the CU are unchanged. Only the 10 bits designating the CU where reading has to be done are concerned.

It can be seen that the greater the number of frames that have passed through since the change, the greater will be the number of bits read in the blocks corresponding to the newly allocated CUs.

If we consider the example of FIG. 4, and take position on the row with a rank 4, it will be necessary to read, in the newly allocated blocks, the bits with the rank 0, 2, 4, 8 and 12, whose reverse bit is 0, 4, 2, 1 and 3, hence whose reverse bit of the rank is smaller than or equal to the number of frames that have elapsed since the change.

Figure 5:
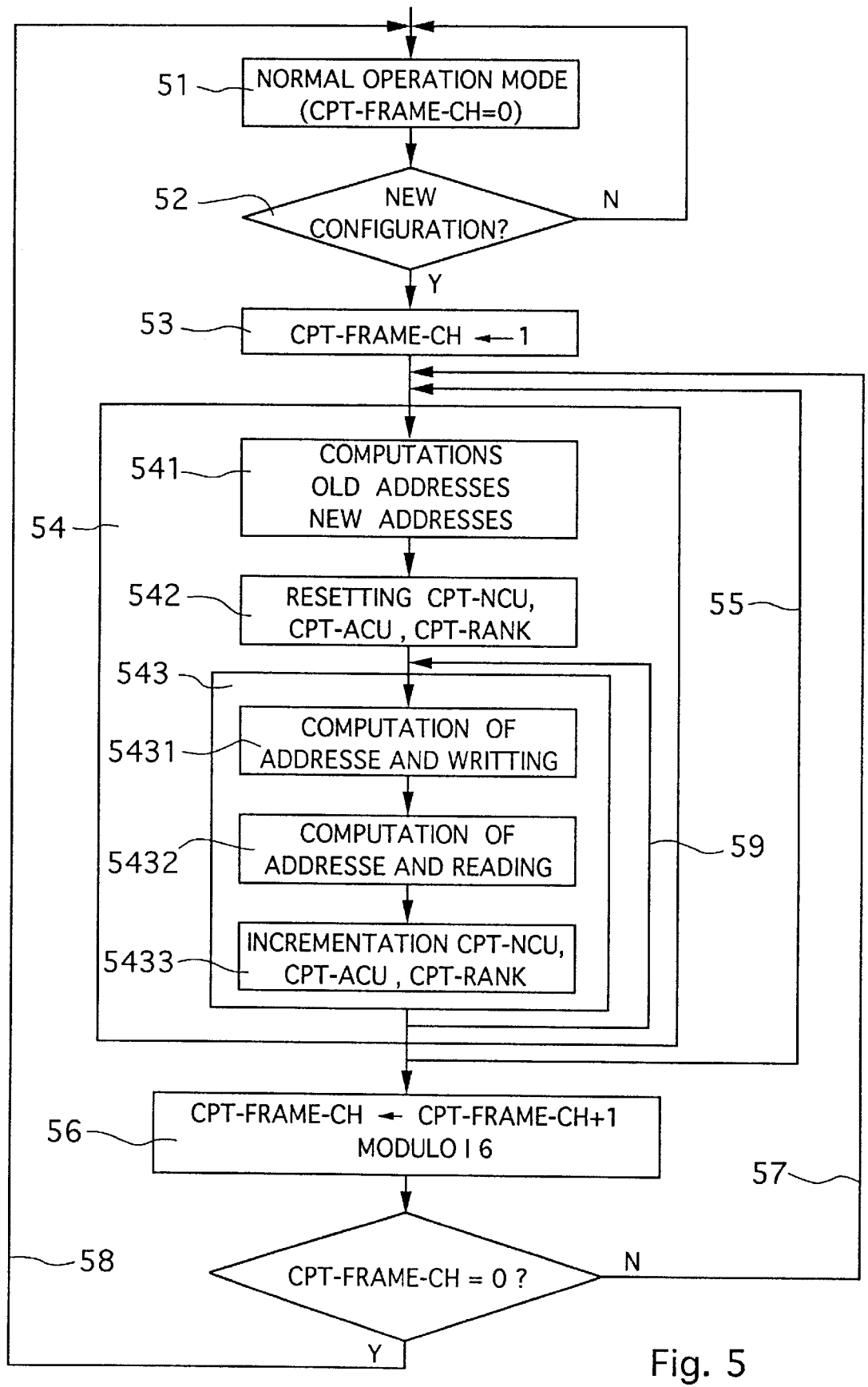
FIG. 5 is a block diagram describing the writing and reading steps according to the invention, during the transient state.

A signal called a "new frame" is therefore generated simply by comparison of two four-bit blocks, one being the number of frames that have elapsed since the change and the other being the representation in reverse bit of the rank modulo 16 of the bit to be read. The 10 read address bits from 15 to 6 will be allocated to the newly allocated blocks when the "new frame" binary signal is activated and, if not, to the formerly allocated blocks. FIG. 5 describes the flow chart of the processing in the event of a change in the configuration of the frequency multiplex.

In a normal state 51, a frame counter has the value 0. When a configuration change command is detected (52), the frame counter takes the value 1 (53). For each of the subchannels, the following operations are performed (54):

the computation 541 of the addresses of the newly and formerly allocated blocks in the interleaving memory array;

the resetting 542 of three counters:

cpt-NCU : 10-bit counter referenced cpt-NCU [9..0] that counts the newly allocated CUs;

cpt-ACU: 10-bit counter referenced cpt-ACU [9..0] that counts the formerly allocated CUs;

cpt-rank: 6-bit counter referenced cpt-rank [5..0] that counts the rank of the bit in the CU;

for each bit data element (loop 59) for example (543):

5431: writing in the memory at the write address described by:
  6 least significant bits [5..0]=cpt-rank [5..0]
  10 medium significance bits [15..6]=cpt-NCU [9..0]
  4 most significant bits [19-16]=cpt-frame+cpt-rank [0..3]

5432: reading in the read memory at the address:
  6 least significant bits [5..0]=cpt-rank [5..0]
  10 medium significance bits [15..6]=cpt-NCU [9..0] if new frame
  cpt-ACU [9..0] else
  4 most significant bits=cpt-frame 5433: incrementation of the cpt-rank counters, and then possibly cpt-NCU and cpt-ACU.

Thus, a looping (55) is done for each sub-channel and then an incrementation 56 is done for the frame counter cpt-frame-ch modulo 16. If cpt_frame_ch is different from 0, the processing is repeated (57) for the new frame. Else, the operation is again (58) in a normal state.

If there is no change, the values cpt-NCU and cpt-ACU are equal and the computation of the write/read addresses in the interleaving memory remain valid.

Figure 6:
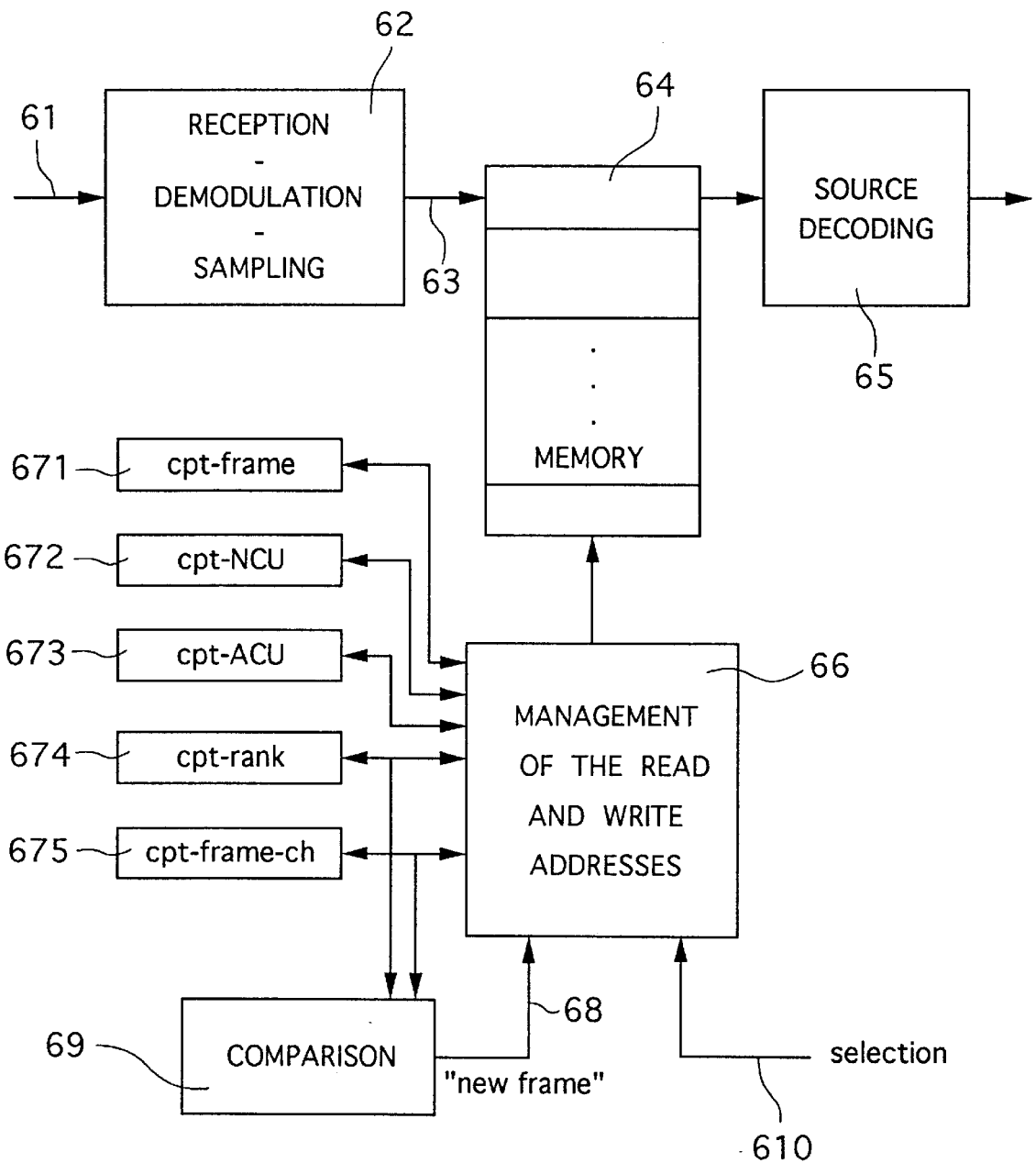
FIG. 6 gives a schematic view of a receiver implementing the invention.

FIG. 6 gives a schematic view of a receiver according to the invention.

The received signal 61 first of all conventionally undergoes the operations of demodulation, filtering, sampling, etc. in a generic reception module 62 enabling the recovery of the data elements 63 forming each frame. These data elements are written in a memory 64 identical to the one implemented at transmission, and then re-read to be transmitted to a source decoding module 65.

The recording and reading in the memory 64 are done symmetrically to the technique implemented at transmission. More specifically, the operations are identical, except for the fact that the interleaved data elements are de-interleaved.

A read/write address management module 66 therefore drives the memory 64. The method implemented essentially corresponds to that illustrated in FIG. 5. The module 66 therefore makes use of five counters:

cpt-frame 671 used to compute the most significant bits of the read and write addresses;

cpt-NCU 672 used to compute the address when the new structure has to be considered;

cpt-ACU 673 used to compute the address when the former structure has to be considered;

cpt-rank 674 used to compute the most significant bits of the read and write addresses;

cpt-frame-ch 675 indicating the number of frames since the beginning of the structure.

The choice between the new structure or the old structure is always done as a function of the "new frame" binary signal 68 resulting from the comparison 69 between cpt-frame-ch and the first 4 bits of cpt-rank.

The time de-interleaving operation implemented in the receiver is dual to the time interleaving operation.

The only difference is the computation of the 4 most significant bits of the write address.

Receiver: 4 most significant bits [19..16]=cpt-frame+(15-cpt-rank [0..3]) (de-interleaving);

Transmitter: 4 most significant bits [19..16]=cpt-frame+cpt-rank [0..3].

The other bits of the write address and the read address have the same expression for the interleaving and the de-interleaving.

It must be noted that, consequently, the structure of a transmitter may be directly deduced from that of the receiver of FIG. 6.

In a normal state (when cpt-frame-ch is equal to 0), the address management module 66 works conventionally, in accordance with the standard.

The change in structuring is reported in a special channel of the frame which the module 66 analyzes constantly. When a change is mentioned, this module 66 makes the cpt-frame-ch go to 1.

One specific feature of the receiver of course is that it is not required to take account of all the capacity units but only those corresponding to the sub-channels of the application to be decoded. This enables the processing operations to be greatly reduced.

For this purpose, the module 66 takes account of a selection information element 610 corresponding for example to the choice of a user.

The invention therefore relates to the method for implementing the reconfiguration as well as to the transmitters and receivers capable of transmitting and receiving the signals thus produced.

It also relates to these signals possessing a structure that is quite novel and not obviously attainable, in a transient state. Indeed, each frame then has a specific and different structure that corresponds neither to the current structure nor to the previous structure. These transient structures are determined by the transmitter on the basis of the previous and current structures as a function of a logic system known to the receiver, so that this receiver can reconstruct the source signals.

We claim:

1. Method for the dynamic reconfiguration of the structure of the frames of a signal in a transmission system providing for the transmission of said signal in the form of successive frames, each comprising one and the same number of capacity units each constituted by one and the same number of data elements, each of said frames being furthermore structured in at least one sub-channel, each of said sub-channels corresponding to a distinct source signal and being formed by a number of capacity units that is an integer, the number, order and/or format of said sub-channels being liable to be modified under the control of a reallocation instruction defining a new frame structure, a time interleaving on N frames being selectively implemented for each of said sub-channels, by means of a memory array formed by N rows each corresponding to the contents of a frame, and wherein, in a normal state, the data elements are recorded as a function of an interleaving relationship and re-read row by row, characterized in that, in a transient state, for the N frames following a reallocation instruction:

the procedure for the recording of said data elements as a function of said interleaving relationship is unchanged, in keeping with the new structure defined by said reallocation instruction; and a specific logic for the re-reading of said memory array is implemented comprising, at least for the capacity units assigned to a new sub-channel in said new frame structure, the steps of:

reading the data elements recorded in said memory array before said reallocation instruction as a function of the organization defined by the previous structure; and reading the data elements recorded in said memory array after said reallocation instruction as a function of the organization defined by the new structure.

2. Method according to claim 1, characterized in that said re-reading logic generates a control signal enabling the selection of a read address for each data element, from a first address corresponding to the preceding structure and a second address corresponding to the new structure.

3. Method according to claim 1, characterized in that said capacity units are constituted by a whole number, greater than or equal to 1, of data zones, each data zone comprising N data elements, and in that said time interleaving is done independently on blocks formed by N zones of data elements of N consecutive frames.

4. Method according to claim 3, characterized in that said time interleaving consists, for each block formed by N rows and N columns, of the computation of a recording address in said block on the basis of the previous address in:

adding 1 modulo N to the column address to determine the new column address; and adding the column address written according to the reverse bit technique to the row address modulo N to determine the new row address.

5. Method according to claim 2, characterized in that said control signal is a binary signal representing, for each data zone, the result of the comparison between:

the number of frames transmitted from the implementation of the new frame structure; and the depiction, according to the reverse bit technique, of the rank modulo N of the current data element in said data zone.

6. Method according to claim 3, characterized in that N is equal to 16 and in that said data elements are binary, and in that, in said transient state, five counters are managed:

a modulo 16 frame counter (cpt_frame);

a counter of the number of frames that have elapsed since a reconfiguration instruction (cpt_frame_ch) equal to 0 in a normal state and counting modulo 16;

a counter of capacity units allocated according to the new structure, on 10 bits (cpt_NCU);

a counter of capacity units allocated according to the preceding structure, on 10 bits (cpt_ACU), a counter of the rank of the binary data element in the capacity unit, on 6 bits (cpt_rank);

a binary signal is determined for comparison between the value of said counter of the number of frames that have elapsed since a configuration instruction (cpt_frame_ch) and the four most significant bits of said rank counter (cpt_rank) read according to the "reverse bit" technique, and in that for each of said sub-channels of each of the frames of said transient state, the following steps are performed:

the computation of the addresses of the blocks in said memory array according to the pervious structure and according to the current structure;

the resetting of the counters cpt_NCU, cpt_ACU, cpt_rank;

for each sub-channel:

the recording, in the memory, of the binary data elements to be recorded at the addresses on 20 bits of which:

the 6 least significant bits correspond to said rank counter (cpt_rank);

the 10 bits of medium significance correspond to said counter of capacity units allocated according to the new structure (cpt_NCU);

the 4 most significant bits correspond to the summation of said frame counter (cpt_frame) and the 4 least significant bits of said rank counter (cpt_rank) read according to the "reverse bit" technique, said rank counter (cpt_rank) being incremented at each data element;

the reading, in the memory, of the binary data elements to be read at the addresses on 20 bits of which:

the 6 least significant bits correspond to said rank counter (cpt_rank);

the 10 bits of medium significance correspond to the counter of capacity units allocated according to the new structure (cpt_NCU) if said binary comparison signal is equal to 1 and, if not, to said counter of allocated capacity units according to the preceding structure (cpt_ACU);

the 4 most significant bits correspond to said frame counter (cpt_frame), said rank counter (cpt_rank) being incremented at each data element;

the incrementation of said counter of capacity units allocated according to the new structure (cpt_NCU) and counter of capacity units allocated according to the previous structure (cpt_ACU).

7. Device for the transmission of a signal in a transmission system providing for the transmission of said signal in the form of successive frames, each comprising one and the same number of capacity units, each constituted by one and the same number of data elements, each of said frames being furthermore structured in at least one sub-channel, each of said subchannels corresponding to a distinct source signal and being formed by a number of capacity units that is an integer, the number, order and/or format of said sub-channels being liable to be modified under the control of a reallocation instruction defining a new frame structure, said device comprising means of time interleaving on N frames acting selectively for each of said sub-channels, by means of a memory array formed by N rows each corresponding to the contents of a frame, and wherein, in a normal state, the data elements are recorded as a function of an interleaving relationship and re-read row by row, characterized in that the device comprises means for the specific making of frames in a transient state, for the N frames following a reallocation instruction, performing:

the recording of said data elements as a function of said interleaving relationship in an unchanged manner, in keeping with the new structure defined by said reallocation instruction; and the specific re-reading of said memory array consisting, at least for the capacity units assigned to a new sub-channel in said new frame structure, in:

reading the data elements recorded in said memory array before said reallocation instruction as a function of the organization defined by the preceding structure; and reading the data elements recorded in said memory array after said reallocation instruction as a function of the organization defined by the new structure.

8. Receiver of a signal in a transmission system providing for the transmission of said signal in the form of successive frames, each comprising one and the same number of capacity units, each constituted by one and the same number of data elements, each of said frames being furthermore structured in at least one sub-channel, each of said sub-channels corresponding to a distinct source signal and being formed by a number of capacity units that is an integer, the number, order and/or format of said sub-channels being liable to be modified under the control of a reallocation instruction defining a new frame structure, said device comprising means of time interleaving on N frames acting selectively for each of said sub-channels, by means of a memory array formed by N rows each corresponding to the contents of a frame, and wherein, in a normal state, the data elements are recorded as a function of an interleaving relationship and re-read row by row, characterized in that the device comprises means for the specific reconstruction of frames in a transient state, for the N frames following a reallocation instruction, performing:

the recording of said data elements as a function of said interleaving relationship in an unchanged manner, in keeping with the new structure defined by said reallocation instruction; and the specific re-reading of said memory array consisting, at least for the capacity units assigned to a new sub-channel in said new frame structure, in:

reading the data elements recorded in said memory array before said reallocation instruction as a function of the organization defined by the preceding structure; and reading the data elements recorded in said memory array after said reallocation instruction as a function of the organization defined by the new structure.

9. Signal designed to be transmitted to at least one receiver and formed by successive frames, each comprising one and the same number of capacity units each constituted by one and the same number of data elements, each of said frames being furthermore structured in at least one sub-channel, each of said subchannels corresponding to a distinct source signal and being formed by a number of capacity units that is an integer, the number, order and/or format of said sub-channels being liable to be modified under the control of a reallocation instruction defining a new frame structure, said data elements presenting a time interleaving on N frames selectively defined for each of said sub-channels, characterized in that the N frames following a reallocation instruction, corresponding to the frames of a transient state, are each formed by homogenous capacity units, formed by data elements coming from the same source signal, obtained by the implementation:

of a procedure for the recording of said data elements as a function of said interleaving relationship in an unchanged manner, in keeping with the new structure defined by said reallocation instruction; and of a specific logic for the re-reading of said memory array comprising, at least for the capacity units assigned to a new sub-channel in said new frame structure, the steps of:

reading the data elements recorded in said memory array before said reallocation instruction as a function of the organization defined by the preceding structure; and reading the data elements recorded in said memory array after said reallocation instruction as a function of the organization defined by the new structure.

\* \* \* \* \*